United States Patent [19]

Tunnell et al.

[11] Patent Number: 4,641,292

[45] Date of Patent: Feb. 3, 1987

[54] VOICE CONTROLLED WELDING SYSTEM

[76] Inventors: George Tunnell, 667 Sandy Hook Ct., Foster City, Calif. 94404; Charles L. Pomernacki, 4162 Barner Ave., Oakland, Calif. 94602; Jack P. Gregg, 2371 Lockwood Ave., Fremont, Calif. 94538

[21] Appl. No.: 789,732

[22] Filed: Oct. 21, 1985

Related U.S. Application Data

[63] Continuation-in-part of Ser. No. 506,101, Jun. 20, 1983, abandoned.

[51] Int. Cl.⁴ .......................... G10K 11/00; B23K 9/10
[52] U.S. Cl. ..................................... 367/198; 219/132; 381/110; 381/42; 340/825.23
[58] Field of Search .................... 340/825.23; 367/197, 367/198; 219/132, 10.55 B, 10.55 C, 121 EA, 130.1, 130.32; 381/110, 42; 307/117; 364/477

[56] References Cited

U.S. PATENT DOCUMENTS

| | | | |
|---|---|---|---|
| 4,147,919 | 4/1979 | Matasovic | 219/132 |
| 4,216,367 | 8/1980 | Riseberg | 219/132 |
| 4,266,114 | 5/1981 | Hansen | 219/132 |
| 4,275,266 | 6/1981 | Lasar | 381/110 |
| 4,340,797 | 7/1982 | Takano et al. | 219/10.55 B |
| 4,340,799 | 7/1982 | Ueda et al. | 219/10.55 C |
| 4,390,954 | 6/1983 | Manning | 364/477 |
| 4,410,789 | 10/1983 | Story | 219/132 |
| 4,462,080 | 7/1984 | Johnstone et al. | 381/110 |
| 4,493,040 | 1/1985 | Vanderhelst | 364/477 |
| 4,516,207 | 5/1985 | Moriyama et al. | 381/42 |

OTHER PUBLICATIONS

"Unraveling the Mysteries of Speech Recognition", by Michael Elthick, *High Technology*, vol. II, No. 2, Mar.-/Apr. 1982, pp. 71–78.
Brochure by Interstate Electronics Corporation, "Voice Recognition Chip Model VRC008", 4 pages, Copyright 1981.

*Primary Examiner*—Donald J. Yusko
*Attorney, Agent, or Firm*—Flehr, Hohbach, Test, Albritton & Herbert

[57] ABSTRACT

Apparatus and method are provided for permitting human voice control of a welding system. A human operator, remote from a welding power supply, uses a welding torch connected by a power line to the welding power supply. The human operator is provided with an audio transmitter which permits the operator to adjust the welding power supply through verbal commands. The verbal commands are issued by the human operator, and are transmitted through a receiver, a voice recognition unit, and a computer, which is electrically connected to deliver power control signals to the welding power supply to thereby adjust the power delivered to the welding torch. The operator may also issue verbal commands to start and stop an internal combustion engine which drives the welding power supply, when such an engine is used. Additionally, when the welding process incorporates a consumable wire electrode, the operator may verbally alter the speed at which the wire electrode is fed through the welding torch. A major advantage of the system is that changes are made without interrupting the welding process.

24 Claims, 5 Drawing Figures

VOICE CONTROLLED WELDING SYSTEM

RELATED APPLICATIONS

This application is a continuation-in-part of Application Ser. No. 506,101, filed June 20, 1983, abandoned.

FIELD OF THE INVENTION

The field of this invention relates generally to providing apparatus and method for human voice control of certain types of welding systems.

BACKGROUND OF THE INVENTION

Human voice controlled machines are known in the art as are remote control systems for welding equipment. U.S. Pat. No. 4,216,367 to Riseberg, issued Aug. 5, 1980, entitled "Wireless Remote Control for Electric Welder", discloses a welding machine which can be remotely controlled. The welding machine has a controllable power supply which is initially set by the human operator to provide a desired power level using a main rheostat. An operator, working at a location remote from the welding machine, carries a pen-type adjustable rheostat which carries calibrations indicative of various percentages of the preset welding current. If the human operator wishes to change the magnitude of the welding current, he need not return to the main rheostat at the welding machine, but instead sets the remote rheostat between the electrode holder and the workpiece. A current transformer in the welding machine senses the output (calibrating) current flowing through the welding cable. A signal proportional to the desired welding current reference is compared with the stored value of the present welding current reference, to produce the control signal, which is fed to an up/-down counter whose output is the stored welding current reference. The welding current reference is thus either increased or decreased until it reaches the value called for by the adjustable remote rheostat. After the power level has been adjusted as desired, the remote rheostat is removed from the electrode holder and placed like a pen back into the pocket of the operator.

U.S. Pat. No. 4,266,114 to Hansen issued May 5, 1981, entitled "Apparatus for the Remote Control of Mains Operated DC and AC Welding Machines", discloses a portable regulating device intended to be connected into the welding current circuit between the electrode or electrode holder and the workpiece or clamp therefor. A regulating device selectively generates different control signals in the welding cables when receiving a current supply through the welding cables. A regulating circuit in the welding machine is adapted to receive these control signals through the welding cables from the regulating device, and to cause regulation of functions in the welding machine.

The regulating circuit consists of a decoding circuit which, in response to the pulse-shape control signals in the welding cables, produces regulating signals for the welding machine, depending upon the number of pulses or the code of pulses being provided by the regulating device. A blocking circuit prevents the formation of regulating signals in the decoding circit when currents of the same order of magnitude as the welding current flow in the welding cables.

U.S. Pat. No. 4,275,266 to Lasar issued June 23, 1981, entitled "Device to Control Machines by Voice", discloses a machine which responds to a plurality of predetermined musical tones which are delivered in a sequence in order to generate a digital control output signal. The audio signal is converted to a sequence of digital number signals which are temporarily stored in a memory. Then a sequence of ratio signals are generated by performing arithmetic division in a systematic order. The resulting sequence of ratio signals is then converted to digital numbers comprising the digital control output signal. A microprocessor, with its associated storage or memory, processes the digital data and controls the conversion of the musical tones into corresponding digital numbers. The device is then made electrically connectable to an apparatus whose operation is to be voice controlled.

U.S. Pat. No. 4,340,797 to Takano and Ueda issued July 20, 1982, entitled "Voice Actuated Heating Apparatus", discloses a heating apparatus such as an electric oven which includes a voice recognition part capable of recognizing voice commands of the user. It produces a recognition code by receiving the voice command and then performing the operation commanded. Heating sequences are preliminarily stored in a memory of a control part, one of them is selected by a recognition code produced by the voice recognition part, and preset in the memory. Heating members are controlled in a manner so as to heat the object according to the preset heating sequence.

U.S. Pat. No. 4,340,799 to Ueda, Takano and Suzuki issued July 20, 1982, entitled "Heating Apparatus with Voice Actuated Door Opening Mechanism", discloses a heating apparatus such as an electric oven having an enclosure with an openable door having a locking means. A voice recognition circuit for recognizing voice commands of the user of the apparatus is connected to a releasing mechanism which permits opening the door in response to a human voice command.

The above-cited U.S. Patents are incorporated by reference into this Specification. Generally, speech recognition machines fall into two broad categories, machines which recognize either (1) isolated words, or (2) continuous speech. Because of the complexity of human speech, most research has concentrated on solving specific tasks, such as recognizing either isolated words or continuous speech with a small vocabulary. Fortunately, many practical applications exist for limited recognition. Isolated word recognition, for example, is adequate for logging freight destinations in warehouses, or identifying and counting items for inventory control.

Even though word recognition machines vary greatly in detail, they all use the same basic recognition process. First, a spoken word is converted into an electrical signal by a microphone. Second, the signal is processed to extract a set of identifying features. Third, the features are then compared to a library of templates representing the machine's vocabulary. Fourth, a word is recognized if it matches one of the templates stored in the machine's memory.

The stored reference templates are created either in a laboratory (speaker-independent), or by using the recognition machine itself in a special training mode (speaker-dependent). When training the machine with his voice, the human speaker repeats each word several times to enable the machine to compute an average template for (1) that word, and (2) that speaker (or class of speakers). The analysis stage of speech recognition consists of the voice recognition unit's extracting identifying characteristics from the electrical analog of the speech signal. Speech recognition machines are described in "Unraveling the Mysteries of Speech Recognition", Michael Elphick, *High Technology*, Vol. 2, No. 2, March/April 1982, pages 71-78; which is hereby incorporated by reference into this Specification.

None of the above-identified patents or articles provides a means for verbally adjusting the power level of an overall welding system, or suggests a combination which would provide for a speech-controlled power adjustment as part of a welding system.

The application of voice recognition technology to welding systems presents many problems. The higher levels of audible noise and electromagnetic interference found in the welding environment are examples of problems which adversely affect the operations of the electronic equipment required for voice recognition.

Making power adjustments manually by the welder-operator is often time consuming and costly, and is sometimes dangerous. For example, a welder on a construction crew, often several floors above the location of a welding power supply, precariously perched on scaffolding or steel I-beams and holding a welding torch, often cannot make the necessary adjustments readily. He might have to return to the ground level where the power supply is located to adjust the power output manually, he might employ an assistant to make the changes for him, or he might carry a foot pedal, connected to the welding power supply by cables, with which he can make the necessary adjustments. Alternatively, if the welder has to manually adjust a device such as that disclosed in U.S. Pat. No. 4,216,367 cited above, there is a time lag in the power adjustment as well as inconvenience to the operator in having to use his hands to make the power adjustment.

Therefore, there is a need for an apparatus and method which would permit a remotely located welder to quickly and safely adjust the power output of a welding power supply located at some distance from the welder, while welding is actually taking place.

OBJECTS AND SUMMARY OF THE INVENTION

Accordingly, in order to resolve the above and other problems of the present technology it is a general object of this invention to provide apparatus and method for human voice controlled welding systems.

More specific objects of this invention are to provide welding apparatus and method which permits a human operator who is physically removed from a welding power unit to give verbal commands which will:

(a) adjust the power level (either voltage and/or current) delivered to the welding torch being used by the human operator; and/or (b) start, stop, and control an internal combustion engine (gasoline or diesel) used to drive the welding power supply, when such an internal combustion engine is used; and/or (c) adjust the speed at which a consumable wire electrode is fed to the welding torch, when such a consumable wire electrode is used.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of any instrumentalities and combinations particularly pointed out in the appended claims.

In one embodiment a human operator is provided with an audio transmitter fitted with a microphone which is capable of receiving an acoustic command signal spoken by the operator. The transmitter converts the acoustic command signal into a transmitted command signal such as electromagnetic waves. A receiver is provided, and receives and converts the transmitted electromagnetic waves into an audio electrical signal in the form of an electric current which contains audio information corresponding to that of the acoustic command signal. An audio interface receives and conditions the audio electrical signal into a series of audio interface output signals. A Voice Recognition Unit (VRU) having a VRU memory contains previously stored voice recognition information (i.e., templates) in the VRU memory, and is capable of receiving and comparing the audio interface output signals with the voice templates stored in the VRU memory, such that only those audio interface output signals which match the voice templates stored in the VRU memory are forwarded as VRU output signals.

A computer with computer memory receives and compares the VRU output signal with welding information stored in the computer memory, and computes a computer digital command signal, which is transmitted as a series of computer output signals. A computer interface is connected to the computer to receive and convert the computer output signals into computer interface output signals. The VRU, the computer, and the computer interface form a Voice Recognition System (VRS). A power control interface receives the computer interface output signals arriving from the computer interface, and supplies an output of power control signals. A welding power supply is connected to a power source by electric power lines, for supplying electric power. The welding power supply is provided with power control means and a power output line connected to a welding torch. The power control means may be preset to the desired power level and range by the human operator prior to use of the welding torch. The welding power supply is responsive to the power control signals produced from the acoustic command signal, to thereby adjust the power control means to supply a new power level to the welding torch.

The power control means on the welding power supply may be adjusted, using a human voice, by the steps of: (a) manually pre-setting the desired power range of the welding power unit; (b) positioning a transmitter within speaking distance of a human operator; (c) transmitting an acoustic command signal to adjust the power level; (d) receiving the command signal; (e) routing the command signal to a Voice Recognition Unit (VRU) having VRU memory for recognition and conversion into a computer recognizable VRU output signal; (f) sending the VRU output signal to a computer which translates the VRU output signal into a computer output signal; and (g) converting the computer output signal to an analog signal and selectively applying that signal to the welding power source to control the operation thereof.

In a second embodiment, the Voice Recognition Unit (VRU) and the digital interface are combined into a Voice Recognition System (VRS) without a separate computer; the additional functions of the computer are performed by the VRU. The VRU memory contains previously stored voice recognition information. The VRU is capable of receiving and comparing the audio interface output signals with the voice recognition information (i.e., templates) contained in the VRU memory. Only those audio interface output signals which match the voice recognition information in the VRU memory are forwarded as VRU output signals. These VRU output signals are transmitted to a digital interface which converts VRU output signals into digital interface output signals.

In a third embodiment, the welding torch is adapted to receive and consume during welding a consumable wire electrode. The power output line is adapted to receive within itself the wire electrode, which is wound onto a rotatable wire spool mounted within a wire electrode supply unit. In response to verbal commands received and forwarded by the VRS and the other components with which it cooperates, the wire electrode is advanced by motor driven first and second rollers, through the power output line, toward and into the tip of the welding torch for consumption during welding.

In a fourth embodiment, an engine means is mechanically coupled to the welding power supply. The welding power supply is provided: (a) internally with an electric power producing means responsive to the engine means to produce electric power, and (b) with a power output line which is connected to a remote welding torch. The welding power supply may be preset to a desired power range by a human operator prior to use of the welding torch. The welding power supply is responsive to the power control signals generated in response to the acoustic command signal, to thereby adjust the power control means to supply a new power level to the welding torch in response to the acoustic command signal. Additionally, the engine means is responsive to the engine control signals generated in response to the acoustic command signal, thereby allowing control of the engine means.

The benefits and advantages of the present invention over the prior art will become particularly apparent from the Detailed Description below. The most significant improvement offered by this invention is that it provides apparatus and method permitting a human welder to verbally adjust the power delivered to the welder's hand-held welding torch, conveniently and immediately, and without interrupting the welding process, simply by issuing verbal commands into a transmitter which communicates through a VRS with the welding power unit. When a consumable wire electrode is used in the welding process, this invention provides method and apparatus for verbally controlling the speed at which the consumable wire is fed through the welding torch. When used at remote locations where there are no electric power lines and the welding power supply is driven by an internal combustion engine, this invention provides the apparatus and means for verbally controlling the internal combustion engine.

BRIEF DESCRIPTION OF THE DRAWINGS

The accompanying drawings, which are incorporated into and form a part of the Specification, illustrate various embodiments of the invention and, together with the Detailed Description, serve to explain the principles of the invention. In the drawings.

DETAILED DESCRIPTION OF A PREFERRED EMBODIMENT

Figure 2:
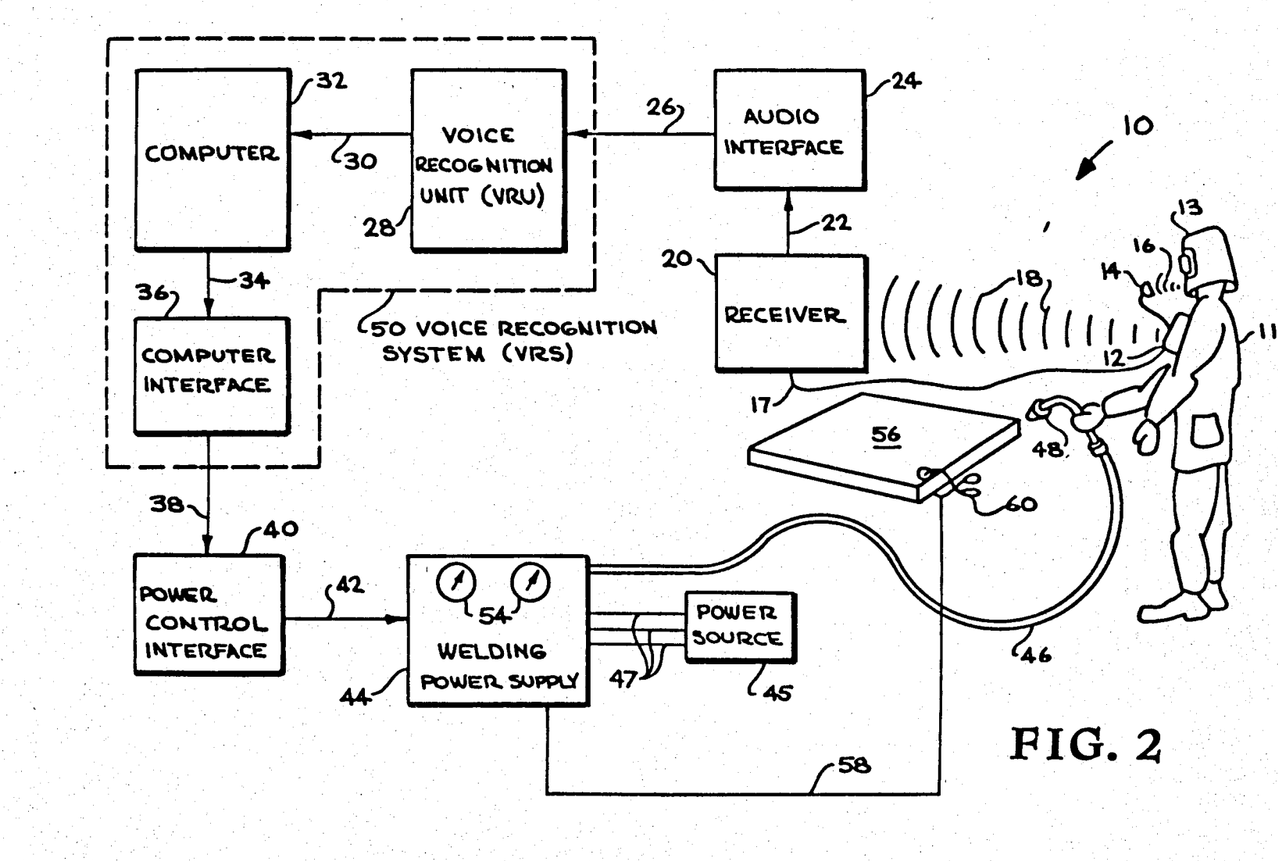
FIG. 2 is a schematic view of the assembly and operation of a first embodiment of the voice controlled welding system of this invention.
Figure 4:
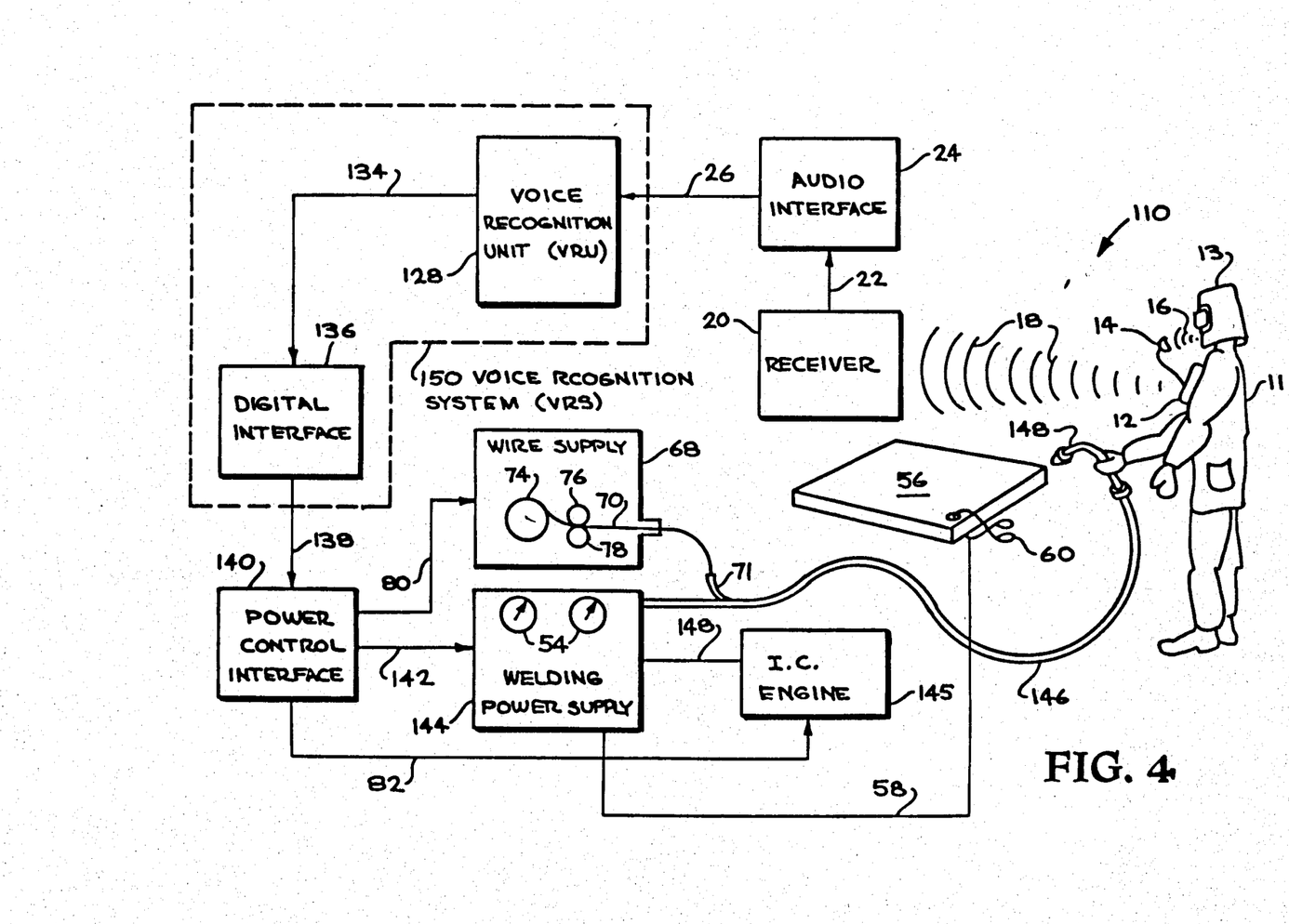
FIG. 4 is a schematic view of additional embodiments of the assembly and operation of the voice controlled welding system of this invention.

The present invention is particularly useful in electrical welding systems utilizing gas tungsten arc welding (GTAW) and gas metal arc welding (GMAW). Both the GTAW and GMAW systems are continuous processes wherein the welding operation is performed manually by a skilled and well-trained welder. An example of the GTAW system is shown in FIG. 2. A GMAW system is shown in FIG. 4. The present invention can be used with a welding system driven by a source of electrical power (see FIG. 2) or by an internal combustion (I.C.) engine (see FIG. 4).

Figure 1:
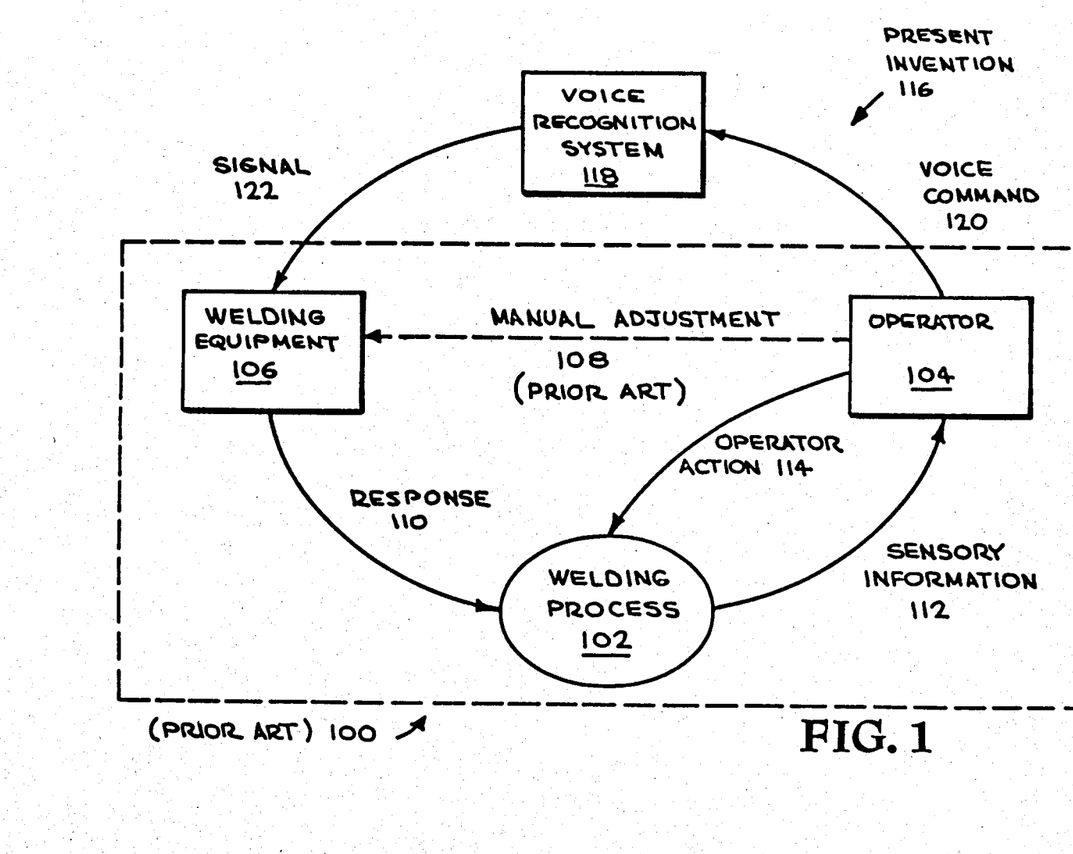
FIG. 1 is a simplified block diagram showing the present invention and how it differs from the prior art.

Referring now to FIG. 1 wherein a simplified block diagram shows the present invention and how it differs from the prior art. The prior art system 100, contained within the dashed lines, is a system having two elements, human operator 104 and welding equipment 106, which interact with the welding process 102. To adjust the power output of welding equipment 106, operator 104 must perform a manual operation, indicated by dashed line 108, such as depress a foot pedal (not shown) or turn a knob (not shown), both connected to welding equipment 106. This manual operation 108 may be performed remotely. Welding equipment 106 then responds, as indicated with response line 110, by delivering a new power output to the welding process 102. The operator 104, who is closely observing the welding process 102, receives sensory information 112 (primarily visual) from the welding process 102 and moves the welding torch (not shown) along the weld by operator action 114.

In contrast, the present invention 116 incorporates a Voice Recognition System (VRS) 118. Now, according to the invention, operator 104 issues a voice command indicated by line 120, which is received by VRS 118, interpreted, and then sent as an electrical command signal indicated by line 122. Welding equipment 106 receives and responds to signal 122, to generate the response indicated with line 110, which is a new power output for use in welding process 102. Therefore, the manual adjustment 108 of welding equipment 106 is eliminated and replaced by verbal operation using the means of voice command 120, VRS 118, and signal 122.

FIG. 2 shows a GTAW welding system 10 according to an embodiment of the invention in which a human operator 11 carries a transmitter 12 having a microphone 14. The microphone 14 and transmitter 12 are attached to welding mask 13 worn by welders to protect their vision and face during welding, or alternatively, to the operator's clothing or person.

The welding system includes a welding power supply 44. The power output of supply 44 may be adjusted by regulating the voltage and/or current. Current controls, however, are much more common. Thus, the present invention will be described with respect to a power supply 44 that is regulated by adjusting current.

Operator 11 must perform two steps prior to commencing welding: (1) manually pre-set the power range of the welding power supply 44 with power control means 54 to obtain the desired range of current, which current flows through power output line 46 to the handheld welding torch 48 used by operator 11 to weld on workpiece 56; and (2) if the Voice Recognition Unit (VRU) 28 provided with voice recognition unit memory (i.e., VRU memory), discussed below, is not preprogrammed, then operator 11 must place VRU 28 in a special training mode to "teach" the VRU memory of unit 28 to recognize the specific commands or words, as spoken by that speaker or operator.

If operator 11 is using welding torch 48 on workpiece 56 but desires to adjust the power output of welding power supply 44, operator 11 speaks a command into microphone 14, which converts this acoustic command signal 16 into an electrical signal which can be converted by transmitter 12 into a transmitted command signal 18. Alternatively, wire 17 can be connected to and span the distance between transmitter 12 and receiver 20, through which wire the electrical signal representing acoustic command signal 16 can be sent. Receiver 20 receives the electrical signal 18 and converts it into an analog audio electrical signal 22, which contains essentially the same information (but in different form) as acoustic command signal 16, the command issued by operator 11. Audio electrical signal 22 is sent to audio interface 24 for conditioning to produce an audio interface output signal 26 which can be accepted by the voice recognition unit 28.

A voice recognition unit (VRU) 28 with VRU memory receives signal 26 and compares it to information (i.e., voice templates) stored in its memory. If signal 26 matches one of these stored voice templates, then VRU 28 transmits this recognized command as a series of digital VRU output signals 30 to computer 32 which is provided with its own computer memory. VRU 28 performs the functions of: (1) comparing the audio interface output signal 26 to the voice templates which operator 11 stored in the memory of VRU 28 in the training mode (speaker-dependent), or which information was preprogrammed into the VRU memory by, for example, the manufacturer of the VRU 28 (speaker-independent), and (2) generating the appropriate output signal 30 when an audio interface output signal 26 is found to match one of the voice templates.

As alluded to, there are two classes of speech-recognition systems: speaker-independent and speaker-dependent. These systems may recognize either isolated words or connected words.

A speaker-dependent system requires users to "train" it to their voices, using a predetermined vocabularly. To recognize a speaker's words, the voice input system analyzes samples of that person's speech. These samples capture the normal variations of that speaker in the form of voice templates.

Most commercially available voice-input systems today are speaker-dependent, because of their lower cost and relatively higher performance.

Speaker-independent recognition allows any person's voice to be recognized without that individual training the system. For each word in the system's vocabulary, speech samples from hundreds of persons must be collected, properly processed, and clustered. Only then can an unknown person's speech be reliably recognized.

Isolated-word recognition requires a brief silence between each word to allow the system to separate the spoken words from one another and eliminate the effects of coarticulation. A shortcoming of isolated-word recognition is the time it takes to complete the data entry.

Connected-word recognition eliminates the short pauses between words. Hence, users can string a series of words together for faster data entry. Connected-word recognition is becoming less costly, more efficient, and more widely accepted through the use of low-cost powerful digital signal processing chips.

Speech recognition systems may utilize a digital inverse filter approach. This approach involves four steps. An autocorrelation step extracts relevant parameters from the spoken word. These parameters are passed through an inverse filter formed by the reference templates. When a spoken word matches a word whose template is stored in memory, the energy in a residual or output signal falls below a threshold. A dynamic programming algorithm allows a match to occur even if the spoken word is uttered at a different speed from the stored word. An event detector senses possible matches and passes them to a high-level decision function. There the right word is selected from the pre-stored reference set.

Preprogrammed voice templates (speaker-independent) for each word in the VRU's vocabularly are made up from samples of speech from many persons. Alternately, in the case of a "known" welder or speaker (speaker-dependent), the VRU is placed in a teach or training mode and that speaker repeats the words in the vocabulary several times so that the VRU can build templates of that speaker's speech pattern. Speech recognition systems are described in greater detail in the above-referenced article by Michael Elphick, "Unraveling the Mysteries of Speech Recognition", incorporated by reference.

An example of commercially available electronic voice recognition unit 28 is the Voice Recognition Chip Model VRC 008, made by Interstate Voice Products, a Figgie International Company, of Orange, Calif., described in the four-page brochure dated September 1984 entitled "Voice Recognition Chip Model VRC 008", which is incorporated by reference into this Specification. The VRC 008 system employs a unique method for processing of analog speech data and recognition of spoken utterances. Designed for a wide variety of voice automation products, the system is speaker-independent, and can recognize with high accuracy eight spoken words or phrases, translating verbal commands (e.g., stop, faster, slower, etc.) into action by associated circuitry.

The manufacturer can customize the VRC 008 for a specific user vocabulary by programming the templates or recognition parameters for the selected vocabulary in the VRC 008. The VRC 008 recognizes speech by detecting significant parameters in the incoming word phrase, and comparing them with the stored voice templates of the prespecified vocabulary. With recognition accomplished, the system then generates an output signal specific to the recognized word.

In the context of the present invention, the VRC 008 could be programmed to respond to the following commands for the applications and actions listed below:

| COMMAND WORD | APPLICATION | ACTION |
| --- | --- | --- |
| ON | IC engine driven welder | Start IC engine |

-continued

| COMMAND WORD | APPLICATION | ACTION |
| --- | --- | --- |
| OFF | IC engine driven welder | Stop IC engine |
| UP | GTAW or GMAW | Increase weld current |
| DOWN | GTAW or GMAW | Decrease weld current |
| FAST | GMAW | Increase wire speed feeder |
| SLOW | GMAW | Decrease wire speed feeder |
| START | GTAW or GMAW | Start welding power supply |
| STOP | GTAW or GMAW | Stop welding power supply |

As discussed previously, if control over both voltage and current is desired, the command vocabulary may be modified accordingly. For instance, as shown below:

| COMMAND WORD | APPLICATION | ACTION |
| --- | --- | --- |
| VOLTS UP | GTAW or GMAW | Increase voltage |
| VOLTS DOWN | GTAW or GMAW | Decrease voltage |
| AMPS UP | GTAW or GMAW | Increase current |
| AMPS DOWN | GTAW or GMAW | Decrease current |

Alternatively, for the GTAW system shown in FIG. 2, where the VRU 28 comprises the standard version of the VRC 008 which has been pre-programmed to respond to the verbal commands GO AHEAD and STOP, the welding power supply 44 may be turned on and off by utilizing these respective commands. The commands FASTER and SLOWER could be utilized to increase or decrease the power output of the welding power supply.

Computer 32, in response to VRU output signal 30, sends computer output signals 34 to a computer or digital interface 36, which operates on computer output signals 34 to produce computer interface output signals 38. These signals 38 are received by a power control interface 40. The VRU 28, computer 32, and interface 36 together comprise Voice Recognition System (VRS) 50. The interface 40 as described below converts signals 38 into control signals 42 recognizable by welding power supply 44. Welding power supply 44 is electrically connected to an electrical power source 45, and receives power through electric power lines 47. Welding power supply 44, upon receiving control signals 42, adjusts the power level (e.g., increase or decrease amperage) as commanded by operator 11. The adjusted (new) power setting is then routed through power output line 46 to welding torch 48 which for example is an electric arc welding torch. Ground cable 58 is electrically connected to power supply 44 and, by clamp 60, to workpiece 56.

As noted, interface 40 receives VRU output signals 38. The output signals correspond to the above-discussed verbal commands for the system of FIG. 2: STOP, GO AHEAD, FASTER, and SLOWER (see FIG. 3). These output signals are produced only when a valid command input is detected by VRU 28. The strobe signal is output for any recognized voice input. The strobe signal is used as a gate control signal for logic gates 70 to produce pulse signals for the up/down counter 72. An example of an up-down counter that may be utilized in this circuit is one distributed by Texas Instruments, and identified by the Part No. 74193N. An example of a logic gate is a Texas Instruments Part No. 7400.

Figure 3:
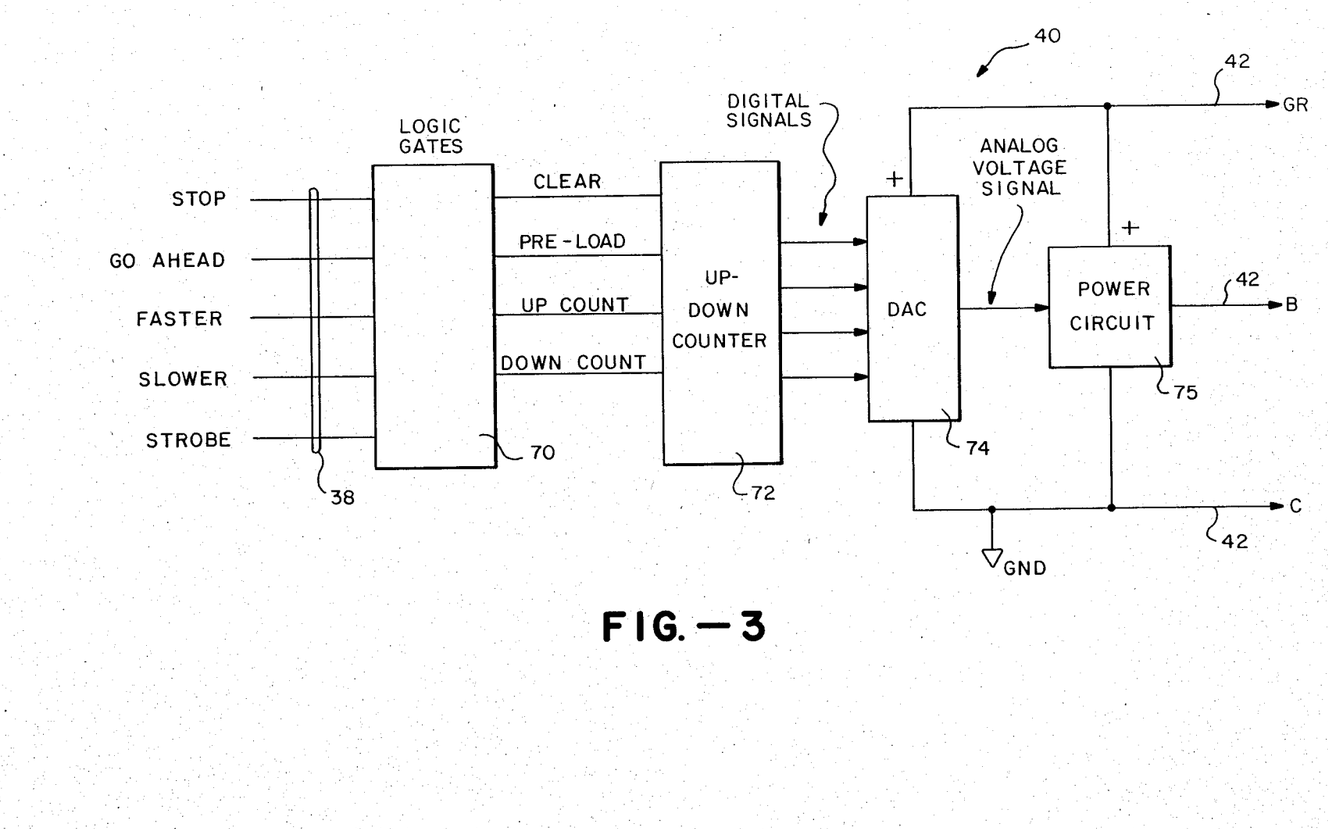
FIG. 3 is a block diagram of the power control interface shown in FIG. 2.

The STOP output signal is the clear signal that zeros the counter. The GO AHEAD signal is the pre-load signal that sets the counter to its initial value, which may be initially determined by the welder setting the power range of welding power supply 44. Thus, this is the nominal starting point for the up-down counter. FASTER is the up-count signal that is used to increment the counter. SLOWER is the down-count signal that is used to decrement the counter. The counter's contents defines the present state of the control action which can vary between 0 and 100%.

The digital-to-analog converter (DAC) 74, such as a National Semiconductor DAC0801LC, accepts the counter output digital signals and produces an analog voltage signal in direct proportion thereto. The analog signal is used by the power circuit 75, comprising a Darlington transistor, to draw current from the remote amperage control of the welding power supply (control signals 42), emulating the function of a conventional foot pedal remote control for a welding power supply.

Devices suitable as transmitter 12 include an FM wireless microphone such as the PASO MA 22-R2 transmitter. A suitable receiver 20 is the PASO FM wireless receiver Model MA 22-R2. Interface 24 is a conventional circuit for level and impedance matching. The function of interface 24 is to couple signals between the two commercially available units, i.e., receiver 20 and VRU 28.

Receiver 20 is electrically connected to interface 24 by means of a pair of shielded electrical wires. Interface 24 is electrically connected to VRU 28 by means of a second pair of shielded electrical wires. Numerous suitable VRU 28 are available. One such system, the Interstate Voice Product Voice Recognition Chip Model VRC 008, discussed in detail above, is speaker-independent and does not require training; the Interstate Voice Proudcts VRC 100 is also suitable. Other voice recognition units are manufactured by Texas Instruments and Votan of Fremont, Calif. These commercial word recognition machines have small vocabularies, typically less than 100 words. Usually the vocabulary consists of (1) names of numbers to provide for numerical data entry and (2) unit names, such as dollars, gallons, tons, etc. In addition to a limited vocabulary, many commercial machines are speaker dependent and recognize no more than a few different speakers without "training" the machine as discussed above. These limitations, however, allow high recognition accuracy ranging from 95% to over 99%.

Also commercially available are integrated voice recognition systems such as voice recognition system 50 indicated on FIG. 2, wherein VRU 28, computer 32, and computer interface 36 are all contained in one electronic package. An example of such a system is an IBM PC plus an Interstate Voice Products Model SRB Voice Recognition Board. Additionally, voice recognition system 50 can be expanded to include audio interface 24 and receiver 20.

Suitable computers for use as computer 32 are available from IBM and include the IBM PC and XT. Computer interface 36 is a conventional logic circuit which couples voice recognition system 50 to the power control interface 40. Power control interface 40 couples voice recognition system 50 to the welding power supply 44 having power control means 54. Welding power supply 44 can be one of the numerous models currently available through such manufacturers as Lincoln, Miller, and Hobart. An example of such a power supply is Hobart Model CT 300. Hobart also manufactures a Model RC 450 which is driven by an I.C. engine. The invention is particularly applicable to electric arc welding systems but may be utilized with other welding systems.

FIG. 4 shows other embodiments according to the invention. FIG. 4 illustrates a GMAW welding system 110. The voice recognition system 50 of FIG. 2 has been modified to become voice recognition system 150 in FIG. 4. Whereas the FIG. 2 voice recognition system 50 comprises a VRU 28, a separate computer 32, and a computer interface 36, in FIG. 4 the voice recognition system (VRS) 150 comprises a VRU 128 and digital interface 136. The VRS 150 eliminates the need for a separate computer since the functions are provided in VRU 128.

The GMAW system shown in FIG. 4 uses a consumable wire electrode supply 68. A wire electrode 70 can, for example, be wound onto a rotatable wire spool 74 contained in wire supply 68. Driving means such as first roller 76 and second roller 78 are placed into contact with each other, with wire electrode 70 sandwiched between rollers 76 and 78. Power control interface 140, as discussed in more detail below, can be expanded to provide electrode supply signals 80 to wire supply 68.

In the manner as described above, operator 11 verbally communicates with wire supply 68 by telling it to feed wire electrode 70 at a faster rate or a slower rate. As noted above, the respective command words for these actions may be FAST and SLOW. The verbal command of operator 11 would produce signals from VRS 150 and power control interface 140, to adjust the rate at which motor driven rollers 76 and 78 rotate to supply wire electrode 70. Power output line 146 is provided with a wire port 71, into which wire electrode 70 is fed. Wire port 71 runs within power output line 146 to emerge through a hollow welding torch 148. Consumable wire electrode 70 is driven by rollers 76 and 78, to emerge from a hollow tip (not shown) provided in welding torch 148.

Another embodiment according to the invention is shown in FIG. 4. A variation on welding system 10 is advantageous in certain situations, e.g., when welding is to be performed at a field construction site where electric power lines are not available to provide the needed alternating current to operate welding power supply 144. In such a field construction situation, it is common practice to use an internal combustion engine 145 to drive welding power supply 144 through a drive shaft 148 or other mechanical coupling, and such engine driven power supplies are commercially available. In this embodiment, power control interface 140 is adapted to communicate with I.C. engine 145. In the manner as described previously, operator 11 would communicate with power control interface 140. Operator 11 will issue commands which travel to power control interface 140, which generates power control signals 82 for delivery to engine 145. Operator 11 adjustments include the ability to start, stop, and control the speed of the internal combustion engine 145 with verbal commands. Power control interface 140 also sends control signal 142 to welding power supply, as previously described, to adjust power level is commanded by operator 11.

In the embodiment of FIG. 4, commands for turning the welding supply on and off, and for increasing or decreasing its power output have been changed. Specifically, the command words START and STOP are used to turn the welding supply on and off, respectively. The commands UP and DOWN are utilized to increase or decrease, respectively, the power output of the welding supply 144 (see FIG. 5).

Like the embodiment of FIG. 2, power control interface 140 (see FIG. 5) receives VRU output signals 138. These output signals correspond to the verbal commands for the system of FIG. 4. The strobe signal is used as a gate control signal to logic gate 170 to produce pulse signals for the up/down counters 172 and 177. The STOP output signal is the clear signal that zeros counter 172. The START signal is the pre-load signal that sets counter 172 to its initial value, which, as noted heretofore, may be initially determined by the operator of the system. The UP output signal is the up-count signal that is used to increment counter 172 for an increase in the power output of the welding power supply. The DOWN signal is the down-count signal that is used to decrement counter 172 for a decrease in power output. In this manner, counter 172 defines the current state of the control action which can vary between 0 and 100%.

Figure 5:
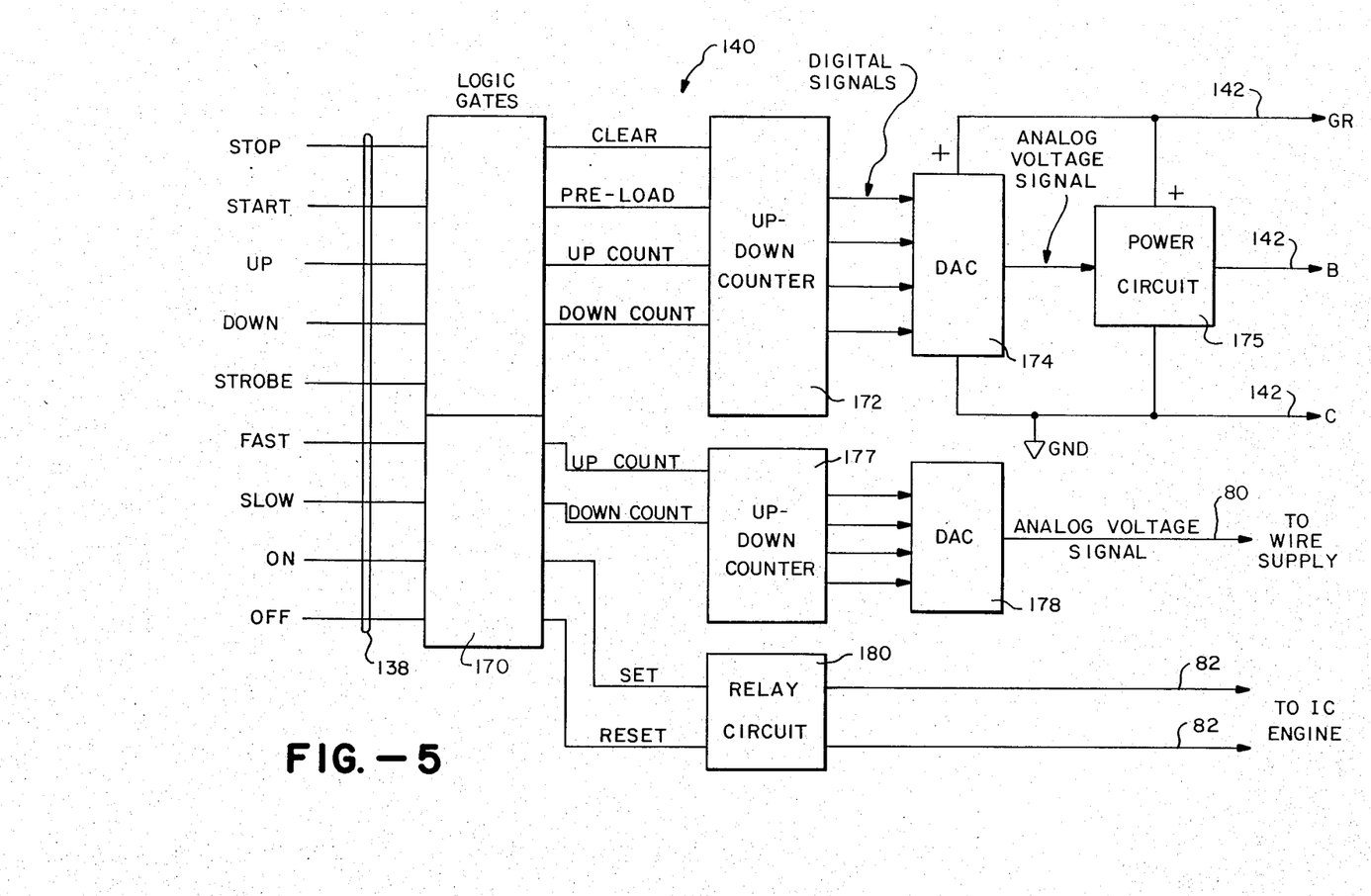
FIG. 5 is a block diagram of the power control interface shown in FIG. 4.

The digital-to-analog converter (DAC) 174 accepts the output digital signals from counter 172 and produces an analog signal in direct proportion thereto. This analog signal is used by the power circuit 175 to draw current from the remote amperage control part of the welding power supply, thereby providing control over the power output of the welding power supply.

As discussed, the other features of the system of FIG. 4, the I.C. engine control and wire supply control, are also voice actuated. The command signals for either increasing or decreasing the rate at which the wire electrode 70 is fed from wire supply 68 are FAST and SLOW, respectively. The command signals for turning the I.C. engine on and off are ON and OFF. Additional command signals, as well as circuitry, may be provided for controlling the speed of the internal combustion engine.

The power control interface 140 receives these additional output signals corresponding to the command words FAST, SLOW, ON, and OFF. FAST is the up-count signal that is used to increment the second counter 177. SLOW is the down-count signal that is used to decrement the second counter 177. The second DAC 178 accepts the second counter output digital signals and produces an analog signal in direct proportion thereto. This analog signal 80 is fed to the wire supply 68 to adjust the rate of feed of the wire electrode.

The ON and OFF signals are used to set and reset the relay circuit 180 that starts and stops, in a conventional manner, the internal combustion engine via control signals 82.

If it is desired to control the speed of the internal combustion engine, command signals such as HIGHER and LOWER may be utilized to provide control over engine speed. To this end, an additional up/down counter and DAC would be connected in the circuit of FIG. 5.

Counters 172 and 177, and DACs 174 and 178 may comprise the parts discussed above with respect to the embodiment of FIG. 2.

This invention thus greatly improves on previous techniques for adjusting the power level of welding power units which are remotely located with respect to the human operator and furthermore, allows these adjustments to be made without interrupting the welding process. By simple verbal commands, the operator can change the power output of the welding power supply, can alter the speed at which a consumable wire electrode is fed to the welding torch, or can control an engine-driven welding power supply, without leaving the area where the work is being performed, without having to manipulate any equipment, and without interrupting the welding process.

The foregoing description of the preferred embodiment of the invention has been presented for purpose of illustration and description. It is not intended to be exhaustive or to limit the invention to the precise form disclosed, and obviously many modifications and variations are possible in light of the above teaching. The preceding embodiments were chosen and described in order to best explain the principles of the invention, and its practical application to thereby enable others skilled in the art to best utilize the invention in various embodiments, and with various modifications as are suited to the particular use contemplated. It is intended that the scope of the invention be defined by the claims appended hereto.

What is claimed is:

1. Apparatus for a human voice controlled welding system, comprising:
    a transmitter for transmitting an acoustic command signal from the human operator;
    a receiver for receiving the transmitted command signal;
    a voice recognition unit containing previously stored voice recognition information, for comparing the received command signal with the stored information to produce a control signal; and
    a welding power supply connected to a welding torch and responsive to the control signal from the voice recognition unit to vary the power output to the torch as orally commanded by the operator.

2. The apparatus of claim 1 wherein the welding power supply includes power control means which are presentable to a desired range within which the operator by voice command can increase or decrease the power output of the welding power supply.

3. The apparatus of claim 1 further including a computer containing previously stored information and connected to the voice recognition unit for generating control signals to the welding power supply.

4. The apparatus of claim 3 wherein the computer is a microprocessor.

5. The apparatus of claim 1 further including an audio interface between the receiver and voice recognition unit, a digital interface following the voice recognition unit, and a power control interface before the welding power supply.

6. The apparatus of claim 1 wherein the voice recognition unit is programmable by the operator.

7. The apparatus of claim 1 wherein the transmitter includes a microphone.

8. The apparatus of claim 7 wherein the microphone is mounted in the welder's helmet.

9. The apparatus of claim 1 wherein the transmitter is an FM wireless transmitter.

10. The apparatus of claim 1 wherein the receiver is an FM wireless receiver.

11. The apparatus of claim 1 wherein the transmitter and receiver are connected by wires.

12. The apparatus of claim 1 wherein the transmitter is a microphone and the receiver is an audio interface before the voice recognition unit, and the microphone is connected to the interface by wires.

13. The apparatus of claim 1 wherein the welding power supply is driven by an internal combustion engine which receives control signals from the voice recognition unit to control the engine.

14. The apparatus of claim 1 wherein the welding power supply is provided with a remote welding torch which is an electric arc welding torch.

15. The apparatus of claim 14, further including a wire supply unit which receives control signals from the voice recognition unit to control the feed of a consumable wire electrode to the welding torch.

16. Apparatus for a human voice controlled welding system, comprising:
    a transmitter for transmitting audio command signals from the human operator;
    a receiver for receiving the command signals;
    a voice recognition means containing previously stored voice recognition information for comparing the received command signals with the stored information to produce digital control signals in response to the reception of the command signals;
    a welding power supply; and
    means connected in circuit between said voice recognition means and the welding power supply for converting the digital control signals to analog control signals and for selectively applying the analog control signals to the welding power supply to control the operation thereof.

17. The apparatus of claim 16 wherein said circuit means comprises logic gate means, up-down counter means, and digital-to-analog converter means connected in circuit.

18. The apparatus of claim 16 further including a wire supply unit which receives analog control signals from said circuit means in response to audio command signals for the control of the operation of said wire supply unit.

19. The apparatus of claim 16 wherein the welding power supply is driven by an internal combustion engine which receives control signals from said circuit means in response to audio command signals to control the operation thereof.

20. A method for human voice controlling a welding power supply, comprising:
    detecting voice commands from a human operator;
    converting the voice commands to electrical command signals;
    generating control signals from the electrical command signals by means of a voice recognition unit; and
    sending the control signals to the welding power supply to vary the power output level to a welding torch as orally commanded by the operator.

21. The method of claim 20 further including presetting the welding power supply to a desired range within which the operator can increase or decrease the levels by verbal commands.

22. The method of claim 20 further including sending control signals to an internal combustion engine driving the welding power supply to control the engine.

23. The method of claim 20 further including sending control signals to a wire supply unit to feed a consumable wire electrode to the welding torch.

24. A method for human voice controlling a welding power supply, comprising:
    detecting verbal commands from a human operator;

converting the verbal commands to electrical command signals;
generating digital control signals from the electrical command signals by means of a voice recognition system; and
selectively applying the digital control signals and converting the same to analog control signals to control the operation of a welding power supply by varying the power output level to a welding torch as verbally commanded.

* * * * *